United States Patent
Motobayashi et al.

(10) Patent No.: US 11,920,752 B2
(45) Date of Patent: Mar. 5, 2024

(54) LIGHT SOURCE DEVICE, HEADLIGHT, DISPLAY APPARATUS, AND ILLUMINATION APPARATUS

(71) Applicant: SONY GROUP CORPORATION, Tokyo (JP)

(72) Inventors: Hisayoshi Motobayashi, Tokyo (JP); Satoshi Wada, Aichi (JP); Kento Hayashi, Ehime (JP); Yuhki Kawamura, Aichi (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,631

(22) PCT Filed: Dec. 16, 2020

(86) PCT No.: PCT/JP2020/046904
§ 371 (c)(1),
(2) Date: Jun. 17, 2022

(87) PCT Pub. No.: WO2021/131946
PCT Pub. Date: Jul. 1, 2021

(65) Prior Publication Data
US 2023/0014812 A1    Jan. 19, 2023

(30) Foreign Application Priority Data
Dec. 25, 2019   (JP) .................................. 2019-234351

(51) Int. Cl.
*F21S 41/176*   (2018.01)
*F21S 41/16*    (2018.01)
(Continued)

(52) U.S. Cl.
CPC ............. *F21S 41/176* (2018.01); *F21S 41/16* (2018.01); *F21S 41/32* (2018.01); *G02B 5/26* (2013.01)

(58) Field of Classification Search
CPC ............. F21S 41/16–176; F21S 41/32; F21V 9/20–32; F21Y 2115/30; G02B 5/0278;
(Continued)

(56) References Cited

U.S. PATENT DOCUMENTS 8,564,185 B2 *  10/2013  Ott ............................ F21K 9/64
                                                         313/498
9,863,595 B2 *   1/2018  Takahira ................ F21S 41/337
(Continued)

FOREIGN PATENT DOCUMENTS

CN    103486542 A    1/2014
CN    104020633 A    9/2014
(Continued)

OTHER PUBLICATIONS

International Search Report and Written Opinion of PCT Application No. PCT/JP2020/046904, dated Mar. 16, 2021, 11 pages of ISRWO.
(Continued)

*Primary Examiner* — Jason M Han
(74) *Attorney, Agent, or Firm* — CHIP LAW GROUP

(57) ABSTRACT

There is provided a light source device, a headlight, a display apparatus, and an illumination apparatus having excellent heat dissipation. The light source device includes a substrate, a phosphor, a light emitting element, and a wavelength-selective reflecting member. The phosphor is disposed in contact with the substrate. The light emitting element emits excitation light for exciting the phosphor. The wavelength-selective reflecting member partially reflects the excitation light emitted from the light emitting element to be
(Continued)

guided to the phosphor and transmits fluorescence emitted from the phosphor by excitation caused by incidence of the excitation light and the excitation light reflected by the phosphor.

16 Claims, 12 Drawing Sheets

(51) Int. Cl.
*F21S 41/32* (2018.01)
*G02B 5/26* (2006.01)

(58) Field of Classification Search
CPC .......... G02B 5/26; G03B 21/204–2066; H01L 25/167; H01L 33/507; H01S 5/0071–0087; H01S 5/02208–02326; H01S 5/32341
See application file for complete search history.

(56) References Cited

U.S. PATENT DOCUMENTS

| | | |
|---|---|---|
| 2013/0250544 A1 | 9/2013 | Zink et al. |
| 2013/0329397 A1 | 12/2013 | Shimizu et al. |
| 2016/0026076 A1 | 1/2016 | Hu |
| 2018/0073716 A1 | 3/2018 | Takada et al. |
| 2018/0087726 A1 | 3/2018 | Yamashita |
| 2018/0283625 A1 | 10/2018 | Inoue et al. |

FOREIGN PATENT DOCUMENTS

| | | |
|---|---|---|
| CN | 104205373 A | 12/2014 |
| CN | 207250931 U | 4/2018 |
| CN | 108139040 A | 6/2018 |
| DE | 112013001620 T5 | 12/2014 |
| EP | 2672178 A2 | 12/2013 |
| EP | 2966502 A1 | 1/2016 |
| EP | 3226363 A1 | 10/2017 |
| JP | 2008-293838 A | 12/2008 |
| JP | 2009-238990 A | 10/2009 |
| JP | 2010-541221 A | 12/2010 |
| JP | 2012-037724 A | 2/2012 |
| JP | 2013-143436 A | 7/2013 |
| JP | 2013-254689 A | 12/2013 |
| JP | 2013-254889 A | 12/2013 |
| JP | 2016-510160 A | 4/2016 |
| JP | 2016-189440 A | 11/2016 |
| JP | 2017-068923 A | 4/2017 |
| JP | 2017-073245 A | 4/2017 |
| JP | 2017-188651 A | 10/2017 |
| JP | 2018-056160 A | 4/2018 |
| KR | 10-2013-0138115 A | 12/2013 |
| KR | 10-2015-0115848 A | 10/2015 |
| TW | 201413166 A | 4/2014 |
| TW | 201435470 A | 9/2014 |
| WO | 2013/142276 A1 | 9/2013 |
| WO | 2014/135040 A1 | 9/2014 |
| WO | 2015/111145 A1 | 7/2015 |
| WO | 2016/158034 A1 | 10/2016 |
| WO | 2017/061227 A1 | 4/2017 |
| WO | 2019/061371 A1 | 4/2019 |

OTHER PUBLICATIONS

Office Action for JP Patent Application No. 2019-234351, dated Dec. 19, 2023, 05 pages of English Translation and 04 pages of Office Action.

* cited by examiner

FIG. 12A
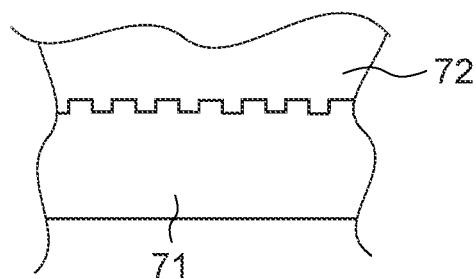
FIG. 12B
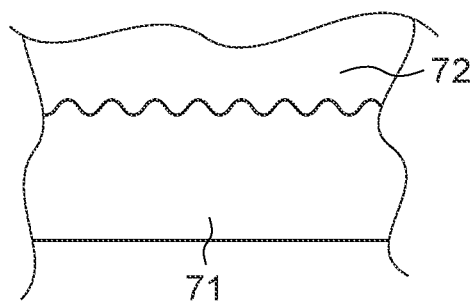
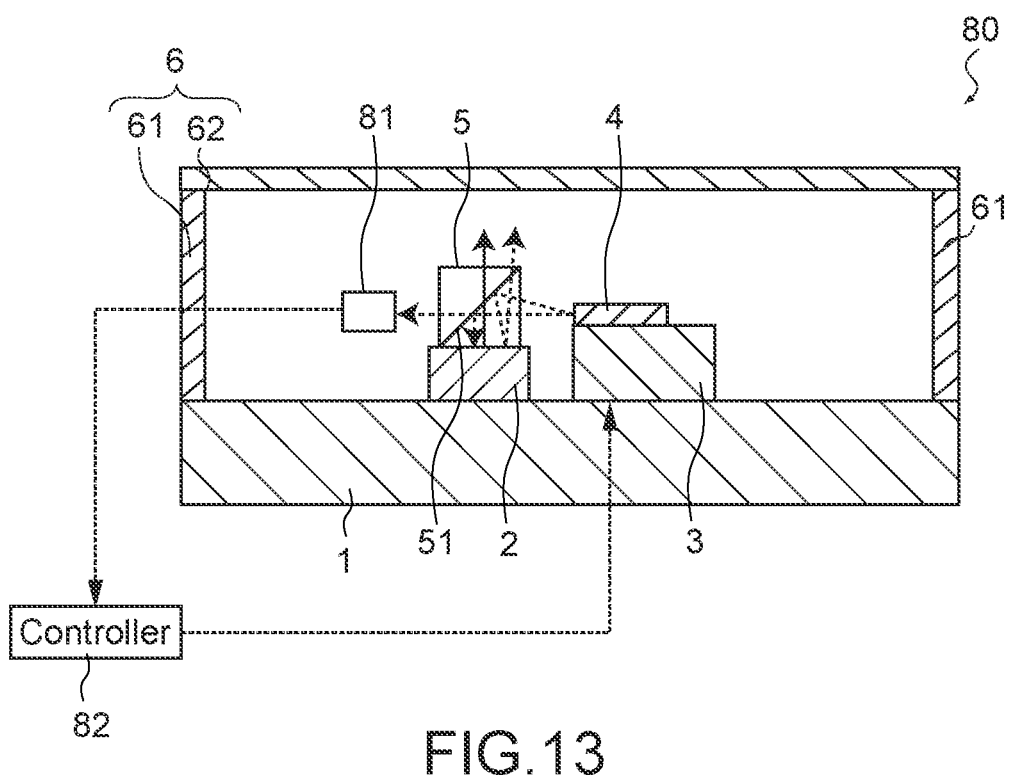
FIG. 13

LIGHT SOURCE DEVICE, HEADLIGHT, DISPLAY APPARATUS, AND ILLUMINATION APPARATUS

CROSS REFERENCE TO RELATED APPLICATIONS

This application is a U.S. National Phase of International Patent Application No. PCT/JP2020/046904 filed on Dec. 16, 2020, which claims priority benefit of Japanese Patent Application No. JP 2019-234351 filed in the Japan Patent Office on Dec. 25, 2019. Each of the above-referenced applications is hereby incorporated herein by reference in its entirety.

TECHNICAL FIELD

The present technology relates to a light source device applicable to a headlight, a display apparatus, and the like.

BACKGROUND ART

Patent Literature 1 describes a light source device including a prism-type phosphor having a reflecting surface that is a mirror for reflecting light incident from a blue laser device and changing the direction of the light. In such a light source device, the prism-type phosphor is attached to a holding member disposed on a base member. The side surface of the holding member is in surface contact with the reflecting surface of the prism-type phosphor, and the other side surface is in surface contact with the base member.

CITATION LIST

Patent Literature

Patent Literature 1: Japanese Patent Application Laid-open No. 2013-254889

DISCLOSURE OF INVENTION

Technical Problem

In the light source device described in Patent Literature 1, heat generated when light is incident and fluorescence excitation of the prism-type phosphor is caused is radiated to the base member through the reflecting surface, which is a mirror, and the holding member. The heat dissipation is thus poor due to the interposition of the reflecting surface and the holding member.

In view of the above circumstances, it is an object of the present technology to provide a light source device, a headlight, a display apparatus, and an illumination apparatus that have excellent heat dissipation.

Solution to Problem

To achieve the above object, a light source device according to an embodiment of the present technology includes a substrate, a phosphor, a light emitting element, and a wavelength-selective reflecting member.

The phosphor is disposed in contact with the substrate.

The light emitting element emits excitation light for exciting the phosphor.

The wavelength-selective reflecting member partially reflects the excitation light emitted from the light emitting element to be guided to the phosphor and transmits fluorescence emitted from the phosphor by excitation caused by incidence of the excitation light and the excitation light reflected by the phosphor.

According to this configuration, the heat generated by the phosphor is rapidly radiated to the substrate.

The wavelength-selective reflecting member may be located on an optical path of the fluorescence and the excitation light reflected by the phosphor with respect to the phosphor.

The substrate may include a recess portion, and at least a part of the phosphor may be disposed in the recess portion.

The recess portion may be formed in a first surface of the substrate, and the phosphor may be disposed in the recess portion such that a surface of the phosphor located on the wavelength-selective reflecting member side is flush with the first surface.

The wavelength-selective reflecting member may be fixed to the substrate.

The wavelength-selective reflecting member may be in no contact with the phosphor.

The wavelength-selective reflecting member may include a first reflecting portion that partially transmits and partially reflects the excitation light emitted from the light emitting element to be guided to the phosphor and transmits the fluorescence emitted from the phosphor by excitation caused by the incidence of the excitation light and the excitation light reflected by the phosphor, and a second reflecting portion that reflects the excitation light transmitted through the first reflecting portion to be guided to outside of the light source device.

The light source device may include two of the light emitting elements disposed opposite to each other with the wavelength-selective reflecting member interposed therebetween.

The wavelength-selective reflecting member may include a first reflecting portion that partially reflects first excitation light emitted from one of the two light emitting elements to be guided to the phosphor and transmits fluorescence emitted from the phosphor by excitation caused by the incidence of the first excitation light and the first excitation light reflected by the phosphor, and a second reflecting portion that partially reflects second excitation light emitted from the other one of the two light emitting elements to be guided to the phosphor and transmits fluorescence emitted from the phosphor by excitation caused by the incidence of the second excitation light and the second excitation light reflected by the phosphor.

The first reflecting portion may partially reflect the second excitation light that is transmitted through the second reflecting portion and guided to the first reflecting portion, and the second reflecting portion may partially reflect the first excitation light that is transmitted through the first reflecting portion and guided to the second reflecting portion, to be guided to outside of the light source device.

The wavelength-selective reflecting member may be a single structure including the first reflecting portion and the second reflecting portion.

The substrate and the phosphor may have irregularities on surfaces thereof brough into contact with each other.

The light source device may further include a light receiving element that receives light emitted from the wavelength-selective reflecting member and not emitted to outside of the light source device.

The light source device may further include a control unit that controls output of the excitation light from the light emitting element on the basis of output from the light receiving element.

To achieve the above object, a headlight according to an embodiment of the present technology includes a light source device and an optical system.

The light source device includes a substrate, a phosphor disposed in contact with the substrate, a light emitting element that emits excitation light for exciting the phosphor, and a wavelength-selective reflecting member that partially reflects the excitation light emitted from the light emitting element to be guided to the phosphor and transmits fluorescence emitted from the phosphor by excitation caused by incidence of the excitation light and the excitation light reflected by the phosphor.

Light from the light source device is incident on the optical system.

To achieve the above object, a display apparatus according to an embodiment of the present technology includes a light source device and a light modulation element.

The light source device includes a substrate, a phosphor disposed in contact with the substrate, a light emitting element that emits excitation light for exciting the phosphor, and a wavelength-selective reflecting member that partially reflects the excitation light emitted from the light emitting element to be guided to the phosphor and transmits fluorescence emitted from the phosphor by excitation caused by incidence of the excitation light and the excitation light reflected by the phosphor.

Light from the light source device is incident on the light modulation element.

To achieve the above object, an illumination apparatus according to an embodiment of the present technology includes a light source device.

The light source device includes a substrate, a phosphor disposed in contact with the substrate, a light emitting element that emits excitation light for exciting the phosphor, and a wavelength-selective reflecting member that partially reflects the excitation light emitted from the light emitting element to be guided to the phosphor and transmits fluorescence emitted from the phosphor by excitation caused by incidence of the excitation light and the excitation light reflected by the phosphor.

BRIEF DESCRIPTION OF DRAWINGS

FIGS. 12A and 12B are partial cross-sectional views of a light source device according to a seventh embodiment.

FIG. 13 is a partial cross-sectional view of a light source device according to an eighth embodiment.

MODE(S) FOR CARRYING OUT THE INVENTION

Figure 1:
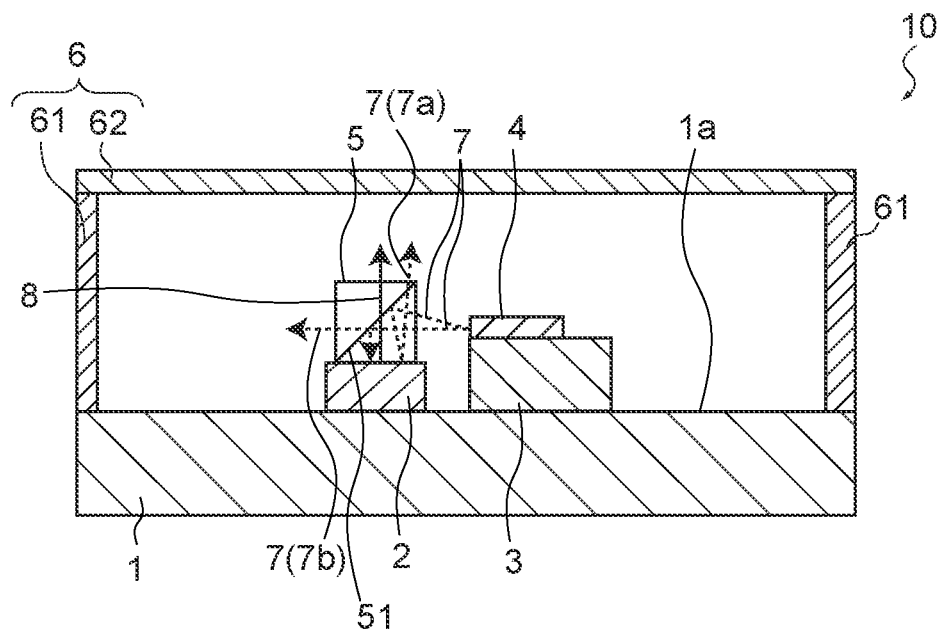
FIG. 1 is a cross-sectional view of a light source device according to a first embodiment of the present technology.

Hereinafter, embodiments of a light source device will be described. The similar reference numerals are assigned to similar components in each embodiment, and the description of the components that have already been described is omitted in some cases. Further, in each figure, excitation light is indicated by a broken line, and fluorescence is indicated by a solid line.

First Embodiment

A light source device according to a first embodiment of the present technology will be described with reference to FIG. 1.

As shown in FIG. 1, a light source device 10 includes a substrate 1, a phosphor 2, a laser diode 4 as a light emitting element serving as an excitation light source, a sub-mount 3, a wavelength-selective reflecting member 5, and a cover 6.

Here, in the light source device 10, an example is given in which white light is generated by blue laser light and yellow light, which is light emitted from a yellow light-emitting phosphor, but the types of a laser light source and a phosphor can be appropriately selected to obtain an arbitrary tint.

Further, in this embodiment, an example is given in which blue laser light and yellow light from a yellow light-emitting phosphor are used in generating white light, but the present technology is not limited thereto.

For example, white light may be generated using blue laser light, and red light and green light emitted from red and green light-emitting phosphors. As still another example, white light may be generated using ultraviolet laser light, and red, green, and blue light emitted from red, green, and blue light-emitting phosphors, respectively.

The substrate 1 is made of a material having excellent thermal conductivity. For example, a ceramic material or a metal member such as AlN, SiC, or $Al_2O_3$ is used for the substrate 1.

The substrate 1 has a first surface 1a. The phosphor 2 and the sub-mount 3 are disposed on the first surface 1a, and the substrate 1 holds them. The substrate 1 is favorably formed of a material having a larger thermal conductivity than the phosphor 2, and thus it is possible to efficiently radiate the heat of the phosphor 2 to the substrate 1. The first surface 1a is a flat surface.

The laser diode 4 emits blue laser light as excitation light. The semiconductor of the laser diode 4 may be a nitride semiconductor such as InAlGaN. The oscillation wavelength of the excitation light from the laser diode 4 is, for example, 400 nm to 530 nm. When white color is generated by combination with the YAG-based phosphor 2, the oscillation wavelength of the excitation light may be 400 nm to 500 nm.

Note that a laser diode is exemplified as a light emitting element serving as an excitation light source in this embodiment, but the present technology is not limited thereto. For example, a light emitting diode (LED) or a vertical cavity surface emitting laser (VCSEL) can be used. For example, when an LED is used, an optical system for focusing the light emitted or the like may be provided. Further, when a VCSEL is used, the VCSEL may be disposed to tilt such that the excitation light is emitted horizontally to enter the wavelength-selective reflecting member 5.

In this embodiment, since an end surface emitting laser diode is used, the optical system as described above is not required. Further, since there is no need to tilt a component like the VCSEL, it is possible to simplify the structure.

The phosphor 2 is excited by the excitation light 7 emitted from the laser diode 4 and emits light. For the phosphor 2 of this embodiment, a yellow light-emitting phosphor can be used, which is excited by blue laser light having a wavelength in a blue wavelength range (for example, 400 nm to 500 nm) emitted from the laser diode 4 and emits yellow light (light in a wavelength range between a red wavelength range and a green wavelength range).

For example, an yttrium-aluminum-garnet (YAG) based phosphor (e.g., $Y_3Al_5O_{12}$) or the like can be used for the phosphor 2.

For the phosphor 2, a ceramic phosphor, a single crystal phosphor, a sintered phosphor, or a sintered body obtained by sintering a material containing a powder phosphor and a binder such as a ceramic material may be used.

The phosphor 2 is disposed such that at least a part of its surface is in contact with the substrate 1 and is fixed to the substrate 1. In this embodiment, the phosphor 2 has a rectangular parallelepiped shape, and one surface thereof is in contact with the first surface 1a of the substrate 1.

In such a manner, the phosphor 2 is disposed in contact with the substrate 1 of high thermal conductivity, and thus the heat generated by the phosphor 2 is efficiently radiated to the substrate 1. This suppresses an increase in the temperature of the phosphor 2, suppresses a decrease in the conversion efficiency of the phosphor 2, i.e., a ratio at which the excitation light enters the phosphor and is converted into fluorescence of a different wavelength, and suppresses a decrease in the output of the white light emitted from the light source device 10.

The sub-mount 3 is for adjusting the position of the emitted light of the excitation light from the laser diode 4 with respect to the wavelength-selective reflecting member 5. By using the sub-mount 3, the height of the laser diode 4 viewed from the substrate 1 is adjusted.

For the sub-mount 3, for example, SiC single crystal, AlN ceramics, Si single crystal, or the like can be used, but the present technology is not limited thereto. By using a material having excellent thermal conductivity for the sub-mount 3, it is possible to efficiently radiate the heat generated from the laser diode 4, and thus it is favorable to form the sub-mount 3 using a material having excellent thermal conductivity.

Further, a step may be provided in place of the sub-mount 3 on the substrate 1 to adjust the position of the laser diode 4, thus eliminating the need for providing the sub-mount 3.

Bonding by solder such as AuSn is used, for example, for bonding of the substrate 1 and the sub-mount 3, and bonding of the sub-mount 3 and the laser diode 4.

Wiring for current injection into the laser diode 4 and an electrode pad are disposed on the sub-mount 3. An application path for applying a current through Au wiring or the like is formed on the electrode pad using wire bonding. If the sub-mount 3 is made of a conductive material, part of the wiring can be omitted.

The wavelength-selective reflecting member 5 has a reflecting surface 51 as a reflecting portion.

As shown in FIG. 1, the wavelength-selective reflecting member 5 is an optical member for partially reflecting the excitation light 7 by the reflecting surface 51 and guiding it to the phosphor 2. Furthermore, the wavelength-selective reflecting member 5 transmits yellow fluorescence 8 emitted from the phosphor 2 by excitation caused by the incidence of the excitation light 7, and blue excitation light 7a (reflected light) reflected by the phosphor 2 without exciting the phosphor 2. In the light source device 10, the yellow fluorescence 8 and the blue excitation light 7a, which is the reflected light reflected by the phosphor 2, are mixed to emit white light to the outside of the light source device 10.

The excitation light 7b, which is not reflected by the reflecting surface 51 and is transmitted through the reflecting surface 51, is emitted from the wavelength-selective reflecting member 5 and is not emitted to the outside of the light source device 10, and thus does not contribute to the white light emitted from the light source device 10.

As shown in FIG. 1, the wavelength-selective reflecting member 5 is disposed, above the phosphor 2 in the figure, in contact with the phosphor 2. The wavelength-selective reflecting member 5 may be fixed to the substrate 1 via a holding member (not shown) or may be fixed to the phosphor 2.

Thus, the optical axis of the light flux of the excitation light 7, which is emitted from the laser diode 4, reflected by the reflecting surface 51 of the wavelength-selective reflecting member 5, and then enters the phosphor 2, is not blurred. Further, the optical axes of the light fluxes of the fluorescence 8 emitted from the phosphor 2 and the excitation light 7a reflected by the phosphor 2 are not blurred, so that the tint and output of the white light emitted from the light source device 10 can be stabilized.

The excitation light 7 emitted from the laser diode 4 is emitted in the horizontal direction. In other words, the excitation light 7 is emitted such that its optical axis is parallel to the incident surface for the excitation light 7 of the phosphor 2. Further, the wavelength-selective reflecting member 5 is disposed such that the reflecting surface 51 thereof forms an angle of approximately 45 degrees with respect to each of the incident surface of the phosphor 2 and the optical axis of the excitation light 7 emitted from the laser diode 4. Here, the term "approximately 45 degrees" includes an error, and includes, for example, 44 to 46 degrees.

The reflecting surface 51 of the wavelength-selective reflecting member 5 partially reflects and partially transmits the excitation light 7 emitted from the laser diode 4, and further transmits the fluorescence 8 from the phosphor 2 and partially transmits the excitation light 7a reflected by the phosphor 2 (reflected light).

Since the reflecting surface 51 is configured to partially transmit the excitation light 7 in such a manner, part of the excitation light 7*a* reflected by the phosphor 2 (reflected light) is transmitted through the reflecting surface 51 to contribute to the white light emitted to the outside of the light source device 10.

The wavelength-selective reflecting member 5 is disposed such that the reflecting surface 51 thereof is located on the optical path of the fluorescence 8 and the excitation light 7*a* (reflected light), and is disposed above the phosphor 2 in the figure. In other words, the reflecting surface 51 of the wavelength-selective reflecting member 5 is located on the emission direction side of white light, which is a mixture of fluorescence and excitation light, with respect to the phosphor 2.

Here, for example, it is assumed that a reflecting portion that reflects the excitation light emitted from the laser diode to be incident on the phosphor is disposed to be shifted close to the laser diode, rather than above the phosphor. In such a case, the distance between the reflecting portion and the phosphor is increased, and the cross-sectional shape of the light flux of the excitation light emitted from the laser diode and incident on the phosphor is easily spread. Therefore, an optical system such as a condenser lens is required.

On the other hand, in this embodiment, the wavelength-selective reflecting member 5 is configured to have the reflecting surface 51 that partially reflects the excitation light 7 and transmits the fluorescence 8. This makes it possible to arrange the wavelength-selective reflecting member 5 above the phosphor 2, which is on the optical path of the fluorescence 8 and the excitation light 7*a* (reflected light) contributing to the white light emitted from the light source device 10.

The reflecting surface 51 of the wavelength-selective reflecting member 5 is disposed above the phosphor 2 in such a manner, and thus it is possible to shorten the distance between the reflecting surface 51 and the phosphor 2, and the cross-sectional shape of the light flux of the excitation light 7 incident on the phosphor 2 is not spread too much. Therefore, the optical system as described above becomes unnecessary, and the wavelength-selective reflecting member itself can be miniaturized, allowing miniaturization of the light source device. Furthermore, since it is possible to reduce the number of components constituting the light source device, it is possible to reduce the cost.

The cover 6 forms a space for holding the phosphor 2, the laser diode 4, the sub-mount 3, and the wavelength-selective reflecting member 5 therein, together with the substrate 1. Nitrogen is filled in the space formed by the cover 6 and the substrate 1.

In such a manner, the light source device 10 is in a hermetically sealed packaged state.

The cover 6 includes a sidewall portion 61 and a lid portion 62.

The sidewall portion 61 is located perpendicular to the first surface 1*a* of the substrate 1 and is provided so as to surround the phosphor 2, the laser diode 4, the sub-mount 3, and the wavelength-selective reflecting member 5.

The lid portion 62 is disposed opposite to the substrate 1 via the sidewall portion 61. The lid portion 62 is made of translucent glass. The white light, which is a mixture of the yellow fluorescence 8 and the blue excitation light 7*a* reflected by the phosphor 2 (reflected light), passes through the lid portion 62 and is emitted to the outside of the light source device 10.

Second Embodiment

A light source device according to a second embodiment of the present technology will be described with reference to FIGS. 2 and 3.

Figure 2:
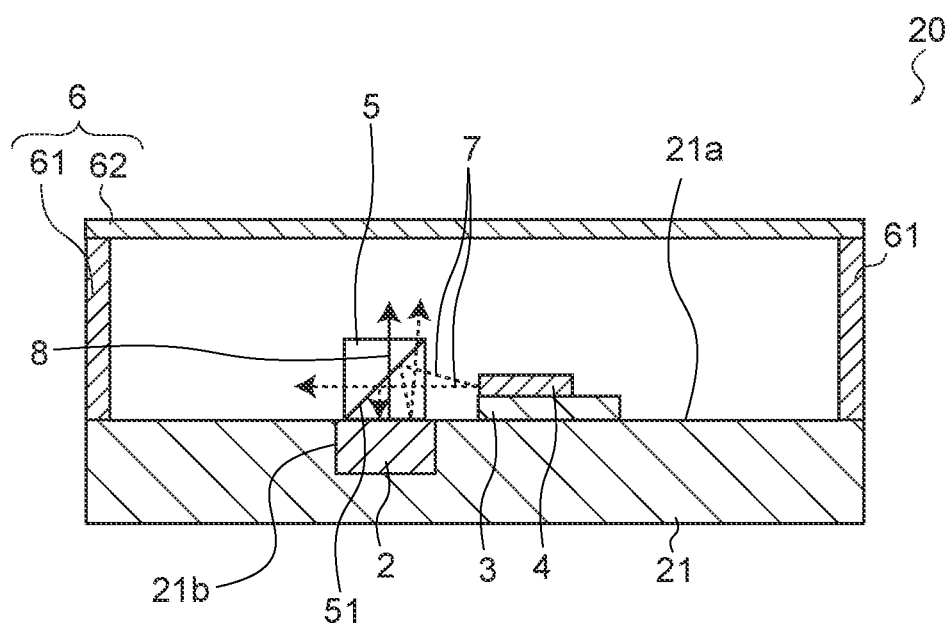
FIG. 2 is a cross-sectional view of a light source device according to a second embodiment.
Figure 3:
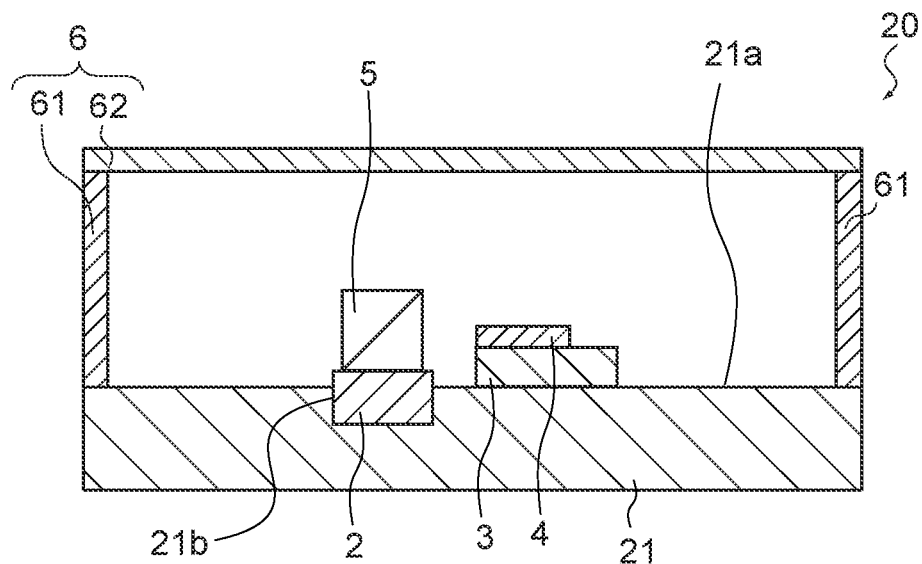
FIG. 3 is a cross-sectional view of another light source device according to the second embodiment.

As shown in FIGS. 2 and 3, a light source device 20 includes a substrate 21, a phosphor 2, a laser diode 4, a sub-mount 3, a wavelength-selective reflecting member 5, and a cover 6.

In the light source device 20 of this embodiment, a recess portion 21*b* is provided in a first surface 21*a* of the substrate 21, and at least a part of the phosphor 2 is disposed in the recess portion 21*b*.

As shown in FIG. 2, the recess portion 21*b* may be provided such that the entire phosphor 2 is embedded in the substrate 21. The phosphor 2 having a rectangular parallelepiped shape is disposed in the recess portion 21*b* such that one surface thereof located on the wavelength-selective reflecting member 5 side (upper surface in the figure) is flush with the first surface 21*a* of the substrate 21.

Alternatively, as shown in FIG. 3, the recess portion 21*b* may be provided such that a part of the phosphor 2 is embedded in the substrate 21. In this case, the phosphor 2 is disposed in the recess portion 21*b* such that a part thereof protrudes from the first surface 21*a* of the substrate 21.

The configuration in which the phosphor 2 is disposed in the recess portion 21*b* of the substrate 21 can be formed by forming the recess portion 21*b* in the substrate 21 and then fitting the phosphor 2 formed in advance in the recess portion 21*b*. Alternatively, the above configuration may be formed by filling a phosphor material in the recess portion 21*b* of the substrate in which the recess portion 21*b* is formed, and then sintering it.

In the configuration of the first embodiment, only one surface of the phosphor 2 (the bottom surface in the figure) is in contact with the substrate 1, but in this embodiment, in addition to the above, the side surface of the phosphor 2 is also in contact with the substrate 21.

Thus, the contact area between the substrate 21 and the phosphor 2 is increased as compared with the first embodiment, and the heat dissipation is further improved. From the viewpoint of increasing the contact area, as shown in FIG. 2, it is more favorable that the phosphor 2 is disposed in the recess portion 21*b* such that one surface of the phosphor 2 located on the wavelength-selective reflecting member 5 side is flush with the first surface 21*a* of the substrate 21, thus improving the heat dissipation.

The heat dissipation is improved in such a manner, which further suppresses a reduction in the conversion efficiency of the phosphor 2, and suppresses the output reduction of white light emitted from the light source device 20.

In the following third to sixth embodiments, the configuration in which the phosphor is disposed in the recess portion formed in the substrate such that the entire phosphor is embedded in the substrate will be described as an example, but a configuration in which the phosphor is disposed in the recess portion such that a part of the phosphor is embedded in the substrate may be provided. Further, as in the first embodiment, the phosphor may be disposed on the first surface of the substrate that is a flat surface.

Third Embodiment

A light source device 30 according to a third embodiment of the present technology will be described with reference to FIGS. 4, 5A, and 5B.

Figure 4:
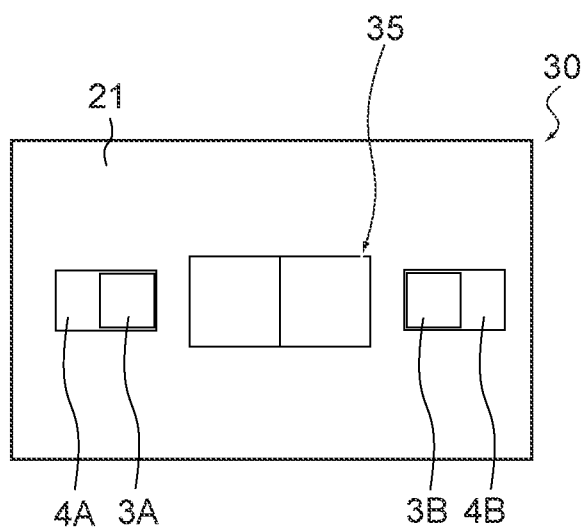
FIG. 4 is a partial plan view of a light source device according to a third embodiment.

FIG. 4 is a partial plan view of the light source device 30 and is a view for describing the positional relationship between laser diodes 4A and 4B and a wavelength-selective reflecting member 35.

Figure 5A:
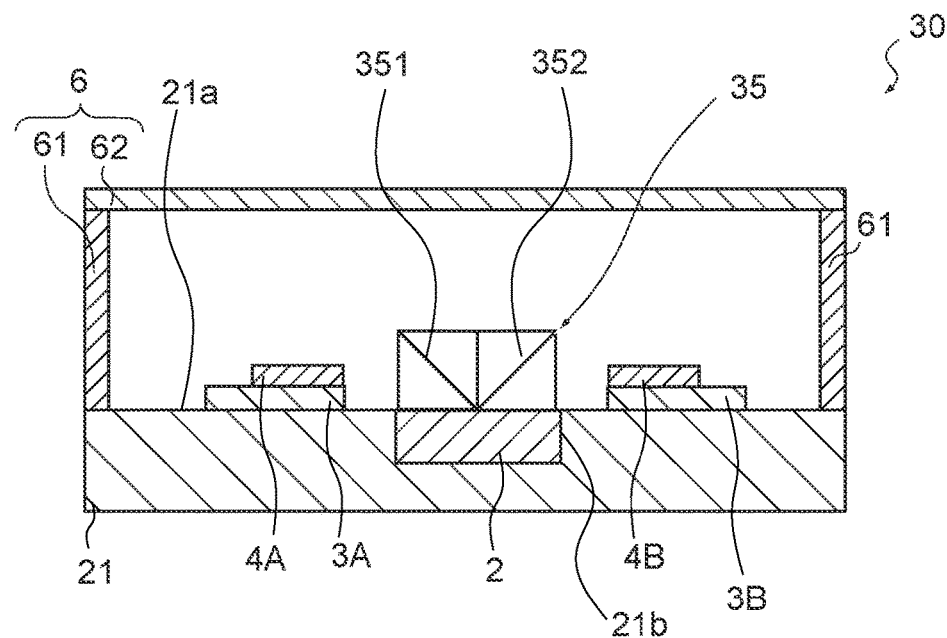
FIG. 5A is a cross-sectional view of the light source device according to the third embodiment.

FIG. 5A is a cross-sectional view of the light source device 30.

Figure 5B:
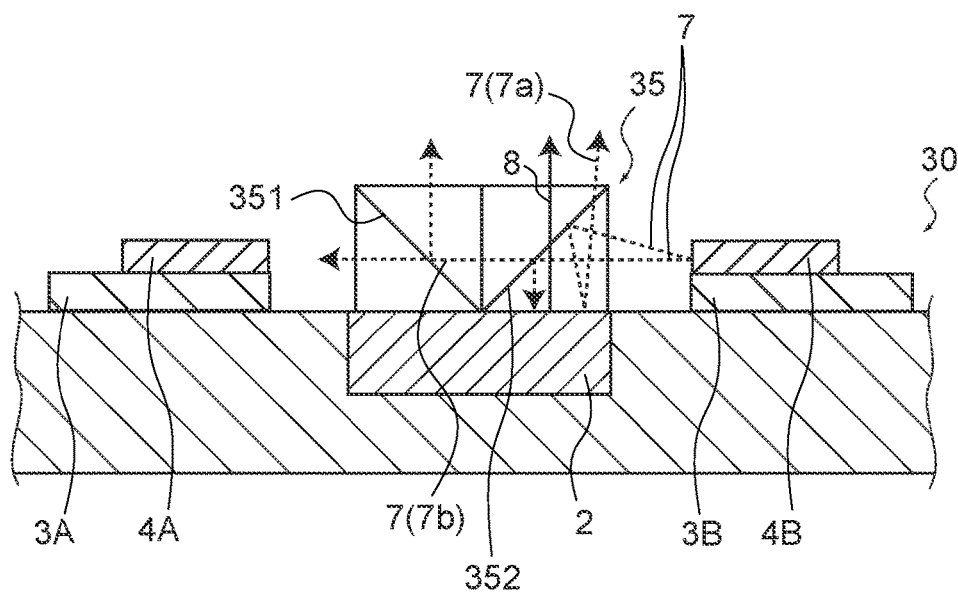
FIG. 5B is a partial cross-sectional view of that light source device.

FIG. 5B is an enlarged partial cross-sectional view of the light source device 30 and is a view for describing the optical path of excitation light 7. In FIG. 5B, for easy viewing of the drawings, only the optical path of the light relating to the excitation light emitted from the second laser diode 4B is shown, but the same applies to the optical path of the light relating to the excitation light emitted from the first laser diode 4A.

As shown in FIGS. 4, 5A and 5B, the light source device 30 includes a substrate 21, a phosphor 2, the first laser diode 4A, the second laser diode 4B, a first sub-mount 3A, a second sub-mount 3B, the wavelength-selective reflecting member 35, and a cover 6.

The first laser diode 4A and the second laser diode 4B have the same configuration as the laser diode 4 of the embodiments described above.

Similarly, the first sub-mount 3A and the second sub-mount 3B have the same configuration as the sub-mount 3 of the embodiments described above.

The first laser diode 4A and the first sub-mount 3A are disposed opposite to the second laser diode 4B and the second sub-mount 3B via the wavelength-selective reflecting member 35.

The wavelength-selective reflecting member 35 has a first reflecting surface 351 as a first reflecting portion, and a second reflecting surface 352 as a second reflecting portion. The first reflecting surface 351 and the second reflecting surface 352 are disposed so as to form a right angle.

The wavelength-selective reflecting member 35 can be configured as a single structure integrated by, for example, attaching a cubic wavelength-selective reflecting member having the first reflecting surface 351 and a cubic wavelength-selective reflecting member having the second reflecting surface 352 with their surfaces being in contact with each other.

As shown in FIG. 5B, the wavelength-selective reflecting member 35 is an optical member for partially reflecting the excitation light 7 from the second laser diode 4B by the second reflecting surface 352 and guiding it to the phosphor 2. Furthermore, although the optical path is not shown in the figure, the wavelength-selective reflecting member 35 partially reflects the excitation light 7 from the first laser diode 4A by the first reflecting surface 351 and guides it to the phosphor 2.

Furthermore, a part of the excitation light 7b transmitted through the second reflecting surface 352 (first reflecting surface 351) without being reflected by the second reflecting surface 352 (first reflecting surface 351) is reflected by the first reflecting surface 351 (second reflecting surface 352) to contribute to the white light emitted from the light source device 30.

Furthermore, the first reflecting surface 351 and the second reflecting surface 352 of the wavelength-selective reflecting member 35 transmit yellow fluorescence 8 emitted from the phosphor 2 by excitation caused by the incidence of the excitation light 7, and blue excitation light 7a reflected by the phosphor 2 (reflected light). As a result, the yellow fluorescence and the blue excitation light are mixed, and white light is emitted from the light source device 30.

In such a manner, two laser diodes are disposed opposite to each other, and the wavelength-selective reflecting member 35 having two reflecting surfaces 351 and 352 is provided, so that the excitation light that has been transmitted through one of the reflecting surfaces and has not been incident on the phosphor can be reflected by the other reflecting surface to contribute to white light. Thus, it is possible to provide a light source device in which the light utilization efficiency is improved.

Note that the wavelength-selective reflecting member having two reflecting surfaces is not limited to the shape of the wavelength-selective reflecting member 35 described above. For example, a quadrangular pyramid shape may be used like a wavelength-selective reflecting member 36 provided in a light source device 31 shown in FIG. 6.

Figure 6:
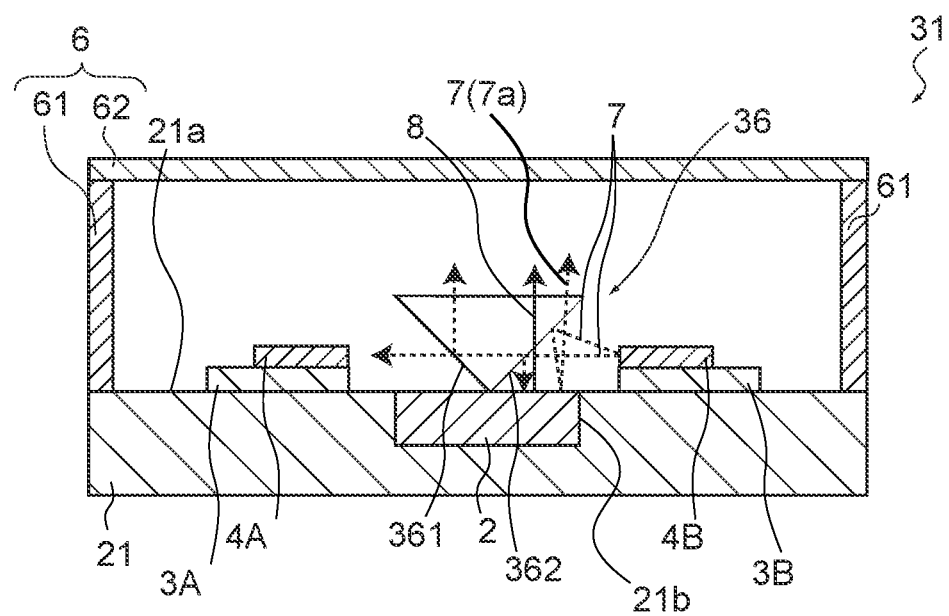
FIG. 6 is a cross-sectional view of another light source device according to the third embodiment.

FIG. 6 is a cross-sectional view of the light source device 31 of another example.

As shown in FIG. 6, the light source device 31 includes a substrate 21, a phosphor 2, a first laser diode 4A, a second laser diode 4B, a first sub-mount 3A, a second sub-mount 3B, the wavelength-selective reflecting member 36, and a cover 6.

The wavelength-selective reflecting member 36 has a quadrangular pyramid shape that is a rectangular pyramid. The wavelength-selective reflecting member 36 is disposed with its apex being positioned on the substrate 1 side and is disposed such that the apex is downward and the bottom surface is upward in the figure.

A pair of opposing side surfaces of the wavelength-selective reflecting member 36 constitute a first reflecting surface 361 as a first reflecting portion and a second reflecting surface 362 as a second reflecting portion. The wavelength-selective reflecting member 36 is a single structure having two reflecting surfaces.

The wavelength-selective reflecting member 36 is disposed using a holding member (not shown) such that the extension of the perpendicular line from the apex to the bottom surface of the wavelength-selective reflecting member 36 is perpendicular to the incident surface of the phosphor 2.

As shown in FIG. 6, the wavelength-selective reflecting member 36 is an optical member for partially reflecting the excitation light 7 from the second laser diode 4B by the second reflecting surface 362 and guiding it to the phosphor 2. Furthermore, although the optical path is not shown in the figure, the wavelength-selective reflecting member 36 partially reflects the excitation light 7 from the first laser diode 4A by the first reflecting surface 361 and guides it to the phosphor 2.

Furthermore, the first reflecting surface 361 and the second reflecting surface 362 of the wavelength-selective reflecting member 36 transmit yellow fluorescence 8 emitted from the phosphor 2 by excitation caused by the incidence of the excitation light 7, and blue excitation light 7a reflected by the phosphor 2 (reflected light). As a result, the yellow fluorescence and the blue excitation light are mixed, and white light is emitted from the light source device 31.

Furthermore, a part of the excitation light 7b transmitted through the second reflecting surface 362 (first reflecting surface 361) without being reflected by the second reflecting surface 362 (first reflecting surface 361) is reflected by the first reflecting surface 361 (second reflecting surface 362) to contribute to the white light emitted from the light source device 31.

In the light source device 31, the yellow fluorescence 8, the blue excitation light 7a reflected by the phosphor 2 (reflected light), and the excitation light transmitted through one reflecting surface and reflected by the other reflecting surface are mixed to emit white light.

In such a manner, two laser diodes are disposed opposite to each other, and the wavelength-selective reflecting member 36 having two reflecting surfaces 361 and 362 is provided, so that the excitation light that has been transmitted through one of the reflecting surfaces and has not been incident on the phosphor can be reflected by the other reflecting surface to contribute to white light. Thus, it is possible to provide a light source device in which the light utilization efficiency is improved.

Fourth Embodiment

A light source device 40 according to a fourth embodiment of the present technology will be described with reference to FIG. 7.

Figure 7:
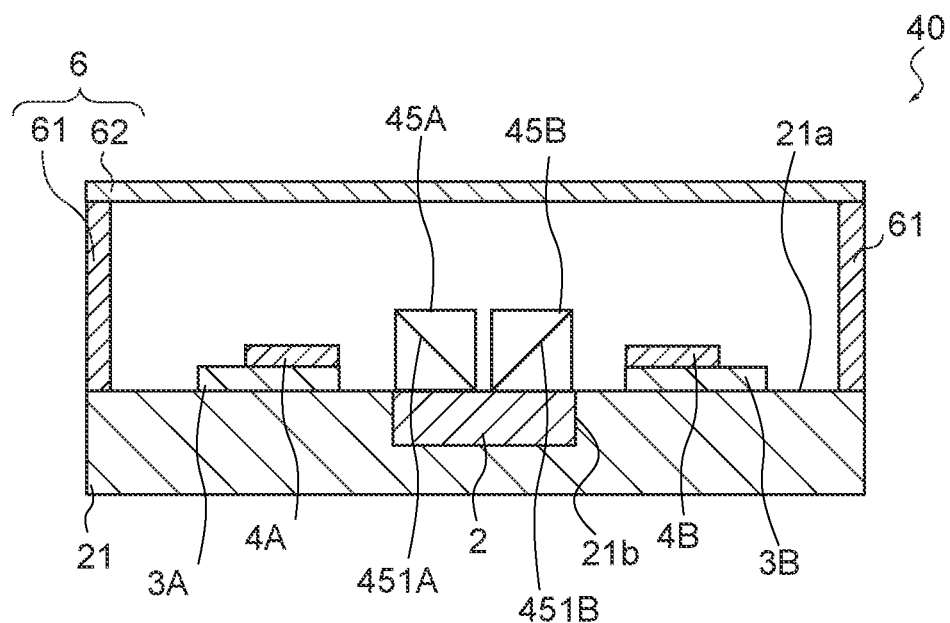
FIG. 7 is a cross-sectional view of a light source device according to a fourth embodiment.

FIG. 7 is a cross-sectional view of the light source device 40.

As shown in FIG. 7, the light source device 40 includes a substrate 21, a phosphor 2, a first laser diode 4A, a second laser diode 4B, a first sub-mount 3A, a second sub-mount 3B, a first wavelength-selective reflecting member 45A, a second wavelength-selective reflecting member 45B, and a cover 6.

The first wavelength-selective reflecting member 45A and the second wavelength-selective reflecting member 45B have the configuration similar to that of the wavelength-selective reflecting member 5 of the first embodiment.

The first wavelength-selective reflecting member 45A (second wavelength-selective reflecting member 45B) has a first reflecting surface 451A (second reflecting surface 451B).

As shown in FIG. 7, the first wavelength-selective reflecting member 45A and the second wavelength-selective reflecting member 45B may be spaced apart from each other. The extension surface of the first reflecting surface 451A and the extension surface of the second reflecting surface 451B are disposed to form a right angle.

In the configuration of this embodiment as well, similarly to the third embodiment, two laser diodes are provided, and the two reflecting surface 451A and 451B are provided, so that the excitation light that has been transmitted through one of the reflecting surfaces and has not been incident on the phosphor can be reflected by the other reflecting surface to contribute to white light. Thus, it is possible to provide a light source device in which the light utilization efficiency is improved.

Furthermore, in this embodiment, the first wavelength-selective reflecting member 45A and the second wavelength-selective reflecting member 45B are spaced apart from each other. Thus, it is possible to adjust the beam shape of the white light emitted from the light source device 40 to any shape by changing the distance between the first wavelength-selective reflecting member 45A and the second wavelength-selective reflecting member 45B.

Fifth Embodiment

A light source device 50 according to a fifth embodiment of the present technology will be described with reference to FIGS. 8 and 9.

Figure 8:
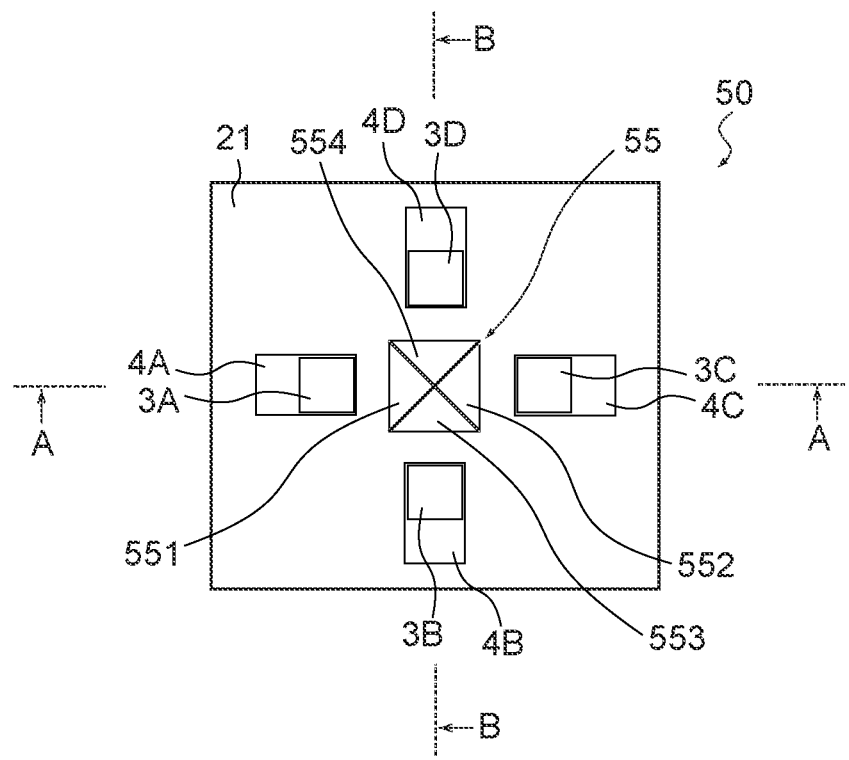
FIG. 8 is a partial plan view of a light source device according to a fifth embodiment.

FIG. 8 is a partial plan view of the light source device 50 and is a view for describing the positional relationship between four laser diodes 4A to 4D and a wavelength-selective reflecting member 55.

Figure 9:
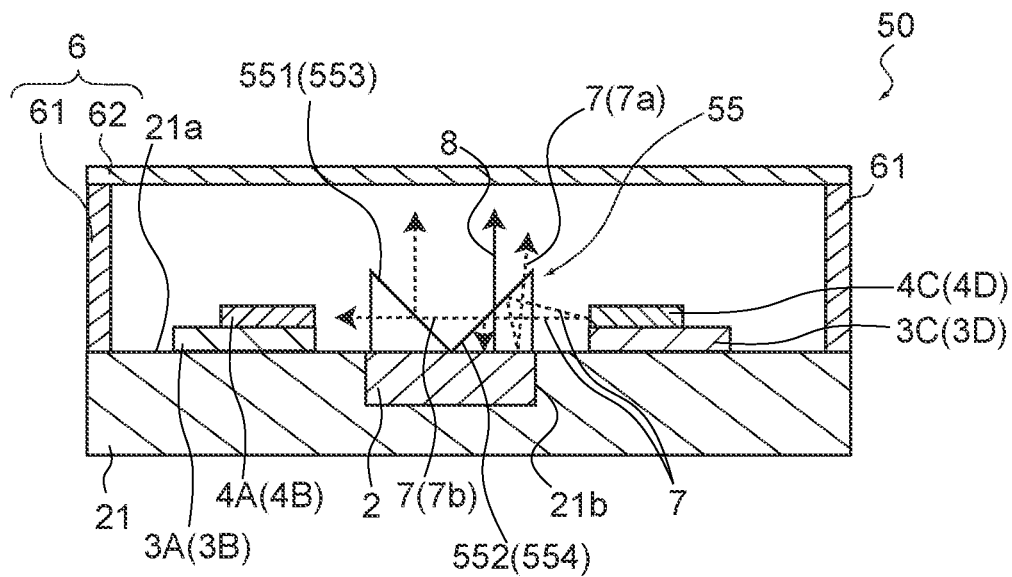
FIG. 9 is a cross-sectional view of the light source device according to the fifth embodiment.

FIG. 9 is a cross-sectional view of the light source device 50, corresponding to a cross-sectional view taken along the lines A-A and B-B in FIG. 8.

Although the optical path of the excitation light 7 is shown in FIG. 9, for easy viewing of the drawings, only the optical path of the light relating to the excitation light emitted from the third laser diode 4C (fourth laser diode 4D) is shown. The same applies to the optical path of the light relating to the excitation light emitted from the first laser diode 4A (second laser diode 4B).

In the third and fourth embodiments, an example has been given in which the two laser diodes are disposed opposite to each other with the wavelength-selective reflecting member interposed therebetween, but four laser diodes may be disposed as shown in FIG. 8.

As shown in FIGS. 8 and 9, the light source device 50 includes a substrate 21, a phosphor 2, the first laser diode 4A, the second laser diode 4B, the third laser diode 4C, the fourth laser diode 4D, a first sub-mount 3A, a second sub-mount 3B, a third sub-mount 3C, a fourth sub-mount 3D, the wavelength-selective reflecting member 55, and a cover 6.

Each laser diode and each sub-mount have the configurations similar to those of the laser diodes and the sub-mounts of the embodiments described above.

The four laser diodes 4A to 4D are disposed corresponding to the respective sides of the rectangular wavelength-selective reflecting member 55 so as to surround it as viewed from the upper side as shown in FIG. 8.

The first laser diode 4A and the first sub-mount 3A, and the third laser diode 4C and the third sub-mount 3C are disposed opposite to each other with the wavelength-selective reflecting member 55 interposed therebetween.

The second laser diode 4B and the second sub-mount 3B, and the fourth laser diode 4D and the fourth sub-mount 3D are disposed opposite to each other with the wavelength-selective reflecting member 55 interposed therebetween.

The wavelength-selective reflecting member 55 has a shape obtained by removing, from one surface side of the rectangular parallelepiped, a quadrangular pyramid having the one surface as the bottom surface. The four inner side surfaces of the wavelength-selective reflecting member 55 are configured as reflecting surfaces, respectively. The wavelength-selective reflecting member 55 has four reflecting surfaces 551 to 554. The reflecting surface 551 (reflecting surface 553) as a first reflecting portion and the reflecting surface 552 (reflecting surface 554) as a second reflecting portion are disposed so as to form a right angle.

The wavelength-selective reflecting member 55 is a single structure having the four reflecting surfaces.

As shown in FIG. 9, the wavelength-selective reflecting member 55 is an optical member for partially reflecting the excitation light 7 emitted from the third laser diode 4C (fourth laser diode 4D) by the reflecting surface 552 (reflecting surface 554) and guiding it to the phosphor 2. Furthermore, although the optical path is not shown in the figure, the wavelength-selective reflecting member 55 partially reflects the excitation light 7 emitted from the first laser diode 4A (second laser diode 4B) by the reflecting surface 551 (reflecting surface 553) and guides it to the phosphor 2.

Furthermore, the reflecting surfaces 551 to 554 of the wavelength-selective reflecting member 55 transmit yellow fluorescence 8 emitted from the phosphor 2 by excitation caused by the incidence of the excitation light 7, and blue excitation light 7a reflected by the phosphor 2 (reflected light). As a result, the yellow fluorescence and the blue excitation light are mixed, and white light is emitted from the light source device 50.

Furthermore, a part of the excitation light 7b transmitted through the reflecting surface 552 (reflecting surface 554)

without being reflected by the reflecting surface 552 (reflecting surface 554) is reflected by the reflecting surface 551 (reflecting surface 553) facing the reflecting surface 552 (reflecting surface 554) to contribute to the white light emitted from the light source device 50.

Similarly, a part of the excitation light 7b transmitted through the reflecting surface 551 (reflecting surface 553) without being reflected by the reflecting surface 551 (reflecting surface 553) is reflected by the reflecting surface 552 (reflecting surface 554) facing the reflecting surface 551 (reflecting surface 553) to contribute to the white light emitted from the light source device.

In such a manner, four laser diodes are disposed, and the wavelength-selective reflecting member 55 having the four reflecting surfaces 551 to 554 is provided, so that the excitation light that has been transmitted through the reflecting surfaces and has not been incident on the phosphor can be reflected by the other reflecting surfaces to contribute to white light. Thus, it is possible to provide the light source device 50 in which the light utilization efficiency is improved.

Sixth Embodiment

Light source devices 60 and 65 according to a sixth embodiment of the present technology will be described with reference to FIGS. 10 and 11.

Figure 10:
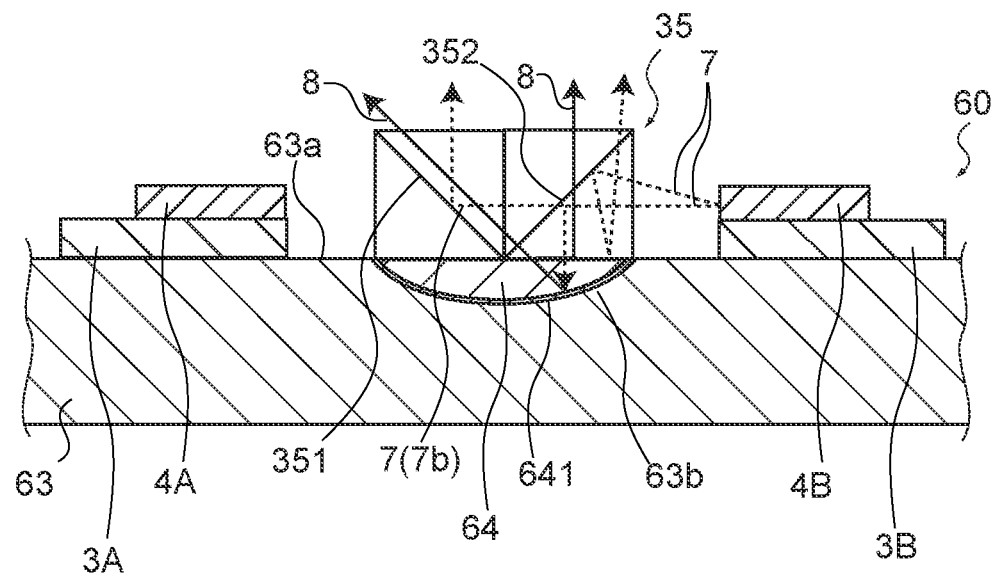
FIG. 10 is a cross-sectional view of a light source device according to a sixth embodiment.

FIG. 10 is a cross-sectional view of the light source device 60. FIG. 11 is a cross-sectional view of the light source device 65.

In any of the light source devices, the shape of the phosphor is different from that of the phosphor 2 of the third embodiment.

As shown in FIG. 10, the light source device 60 includes a substrate 63, a phosphor 64, laser diodes 4A and 4B, sub-mounts 3A and 3B, a wavelength-selective reflecting member 35, and a cover 6.

Figure 11:
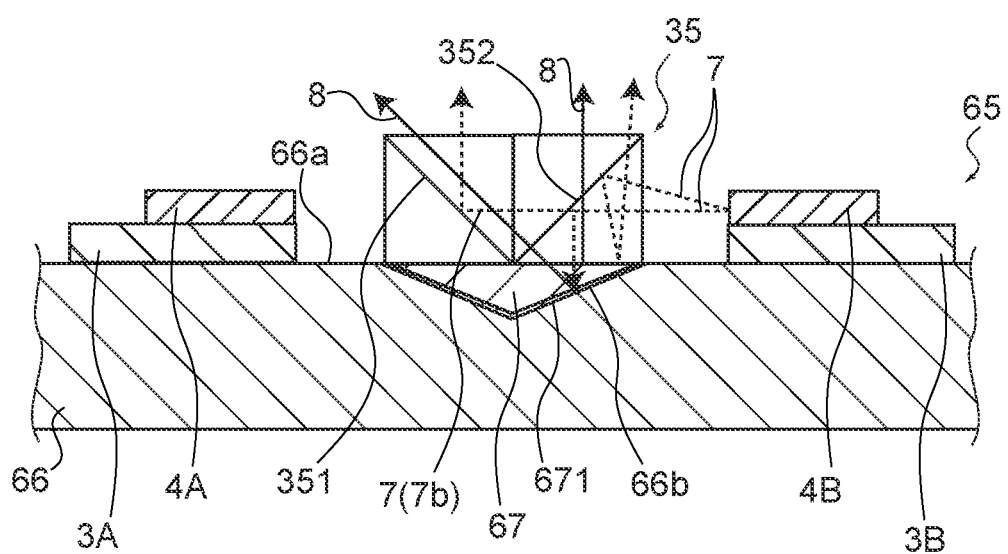
FIG. 11 is a cross-sectional view of another light source device according to the sixth embodiment.

As shown in FIG. 11, the light source device 65 includes a substrate 66, a phosphor 67, laser diodes 4A and 4B, sub-mounts 3A and 3B, a wavelength-selective reflecting member 35, and a cover 6.

In the third embodiment, the phosphor 2 has a rectangular parallelepiped shape, but the phosphor 64 may have a spherical segment shape as shown in FIG. 10, or the phosphor 67 may have a conical shape as shown in FIG. 11.

As shown in FIG. 10, a first surface 63a of the substrate 63 is provided with a recess portion 63b with a spherical segment shape, and the phosphor 64 with a spherical segment shape is disposed in the recess portion 63b. The recess portion 63b is provided such that the entire phosphor 64 is embedded in the substrate 63. The phosphor 64 is disposed in the recess portion 63b such that one surface located on the wavelength-selective reflecting member 35 side (upper surface in the figure) is flush with the first surface 63a of the substrate 63.

As shown in FIG. 11, a first surface 66a of the substrate 66 is provided with a conical recess portion 66b, and the conical phosphor 67 is disposed in the recess portion 66b. The recess portion 66b is provided such that the entire phosphor 67 is embedded in the substrate 66. The phosphor 67 is disposed in the recess portion 66b such that one surface located on the wavelength-selective reflecting member 35 side (upper surface in the figure) is flush with the first surface 66a of the substrate 66.

A reflective film 641 (671) is formed on a surface of the phosphor 64 (67) that is in contact with the substrate 63 (66). As described above, the curved reflective film 641 or the oblique reflective film 671 located obliquely with respect to the first surface 66a of the substrate 66 is provided, so that the excitation light transmitted through the phosphor 64 (67) without exciting the phosphor 64 (67) is reflected by the reflective film 641 (671). Since the reflected excitation light is transmitted through the phosphor 64 (67) again, the reflected excitation light can be used to emit light from the phosphor 64 (67), and the light utilization efficiency is improved.

Further, in this embodiment, the phosphor has the spherical segment shape or the conical shape, but a rectangular parallelepiped shape may be used, in which the thickness of the phosphor is reduced and a reflective film is formed on the surface of the phosphor that is in contact with the substrate.

Seventh Embodiment

FIGS. 12A and 12B are enlarged view of a portion where the substrate and the phosphor are in contact with each other.

In each of the embodiments described above, as shown in FIGS. 12A and 12B, irregularities may be provided on the surface where both a substrate 71 and a phosphor 72 are in contact with each other, specifically, on the surface where the bottom surface of the phosphor 72 and the substrate 71 are in contact with each other.

For example, in FIG. 12A, the cross-sectional shape of the projection is a rectangular shape, and in FIG. 12B, the cross-sectional shape of the irregularities is a waveform. The shape of the irregularities is not limited to those above. For example, the cross-sectional shape of the projection may be a triangular shape or a semicircular shape. Providing the uneven surface in such a manner makes it possible to increase the contact area between the substrate and the phosphor as compared with providing the flat surface, and to further improve the heat dissipation.

Eighth Embodiment

A light source device 80 according to an eighth embodiment of the present technology will be described with reference to FIG. 13.

FIG. 13 is a schematic cross-sectional view of a light source device 80.

As shown in FIG. 13, the light source device 80 includes a substrate 1, a phosphor 2, a laser diode 4, a sub-mount 3, a wavelength-selective reflecting member 5, a cover 6, a light receiving sensor 81 serving as a light receiving element, and a controller 82.

The light receiving sensor 81 is provided in a space surrounded by the substrate 1 and the cover 6.

The light receiving sensor 81 receives light that is emitted from the wavelength-selective reflecting member 5 and is the leakage light that does not contribute to the white light emitted from the light source device 80. A detection result detected by the light receiving sensor 81 is output to the controller 82.

The controller 82 controls the output of the excitation light from the laser diode 4 on the basis of the detection result output from the light receiving sensor 81. The state of the phosphor 2 can be grasped from the detection result. For example, if the deterioration of the function of the phosphor 2 is grasped from the detection result, the controller 82 performs control to increase the output of the excitation light emitted from the laser diode 4, so that the output of the white light emitted from the light source device 80 can be stabilized.

Ninth Embodiment

Figure 14:
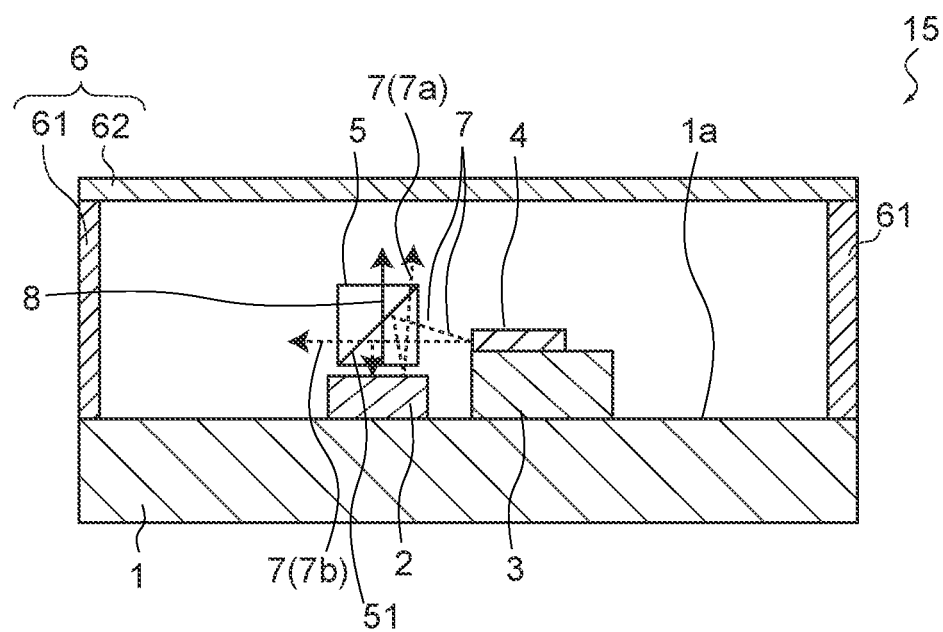
FIG. 14 is a partial cross-sectional view of a light source device according to a modification.

A light source device according to a ninth embodiment of the present technology will be described with reference to FIG. 14.

In each of the embodiments described above, an example has been given in which the wavelength-selective reflecting member 5 and the phosphor 2 are disposed in contact with each other. As in a light source device 15 shown in FIG. 14, however, the wavelength-selective reflecting member 5 and the phosphor 2 may be disposed in a non-contact state. The position of the wavelength-selective reflecting member 5 is fixed via a holding member (not shown) to hold the wavelength-selective reflecting member 5 in the substrate 1.

The wavelength-selective reflecting member 5 and the phosphor 2 are disposed in a non-contact state, so that it is possible to suppress the influence of the heat generated by the phosphor 2 on the wavelength-selective reflecting member 5, and to suppress the occurrence the distortion of the wavelength-selective reflecting member 5 due to the heat. Thus, the optical axis of the light flux is less blurred, and it is possible to stabilize the tint and output of the white light emitted from the light source device 10.

Tenth Embodiment

A light source device 58 according to a tenth embodiment of the present technology will be described with reference to FIGS. 15 and 16.

Figure 15:
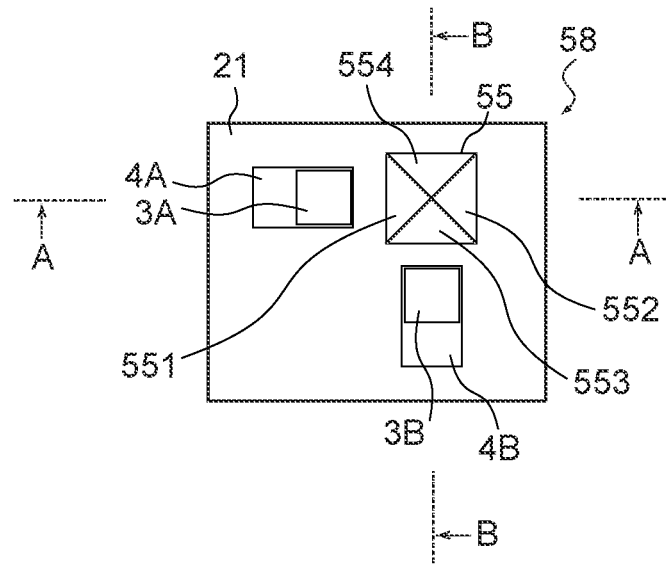
FIG. 15 is a partial plan view of a light source device according to another modification.

FIG. 15 is a partial plan view of the light source device 58 and is a view for describing the positional relationship between laser diodes 4A and 4B and a wavelength-selective reflecting member 55.

Figure 16:
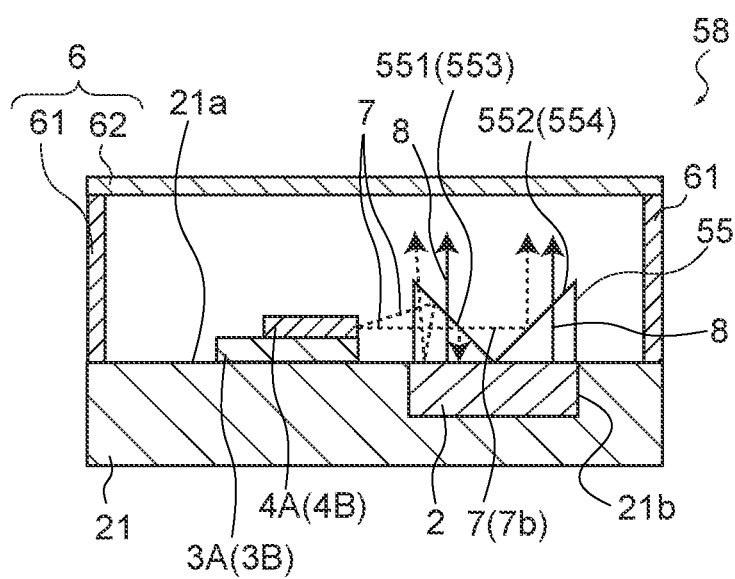
FIG. 16 is a cross-sectional view of the light source device of FIG. 15.

FIG. 16 is a cross-sectional view of the light source device 58, corresponding to a cross-sectional view taken along the lines A-A and B-B in FIG. 15.

In the third and fourth embodiments, an example has been given in which the two laser diodes are disposed opposite to each other through the wavelength-selective reflecting member, but two laser diodes may be disposed to have a positional relationship of 90 degrees with respect to the wavelength-selective reflecting member as shown in FIG. 15.

As shown in FIGS. 15 and 16, the light source device 58 includes a substrate 21, a phosphor 2, the first laser diode 4A, the second laser diode 4B, a first sub-mount 3A, a second sub-mount 3B, the wavelength-selective reflecting member 55, and a cover 6.

The first laser diode 4A and the first sub-mount 3A, and the second laser diode 4B and the second sub-mount 3B are disposed so as to have a positional relationship of 90 degrees with respect to the wavelength-selective reflecting member 55.

The wavelength-selective reflecting member 55 has the same configuration as the wavelength-selective reflecting member of the fifth embodiment and has four reflecting surfaces 551 to 554. The reflecting surface 551 (reflecting surface 553) and the reflecting surface 552 (reflecting surface 554) are disposed so as to form a right angle.

As shown in FIG. 16, the wavelength-selective reflecting member 55 is an optical member for partially reflecting excitation light 7 emitted from the first laser diode 4A (second laser diode 4B) by the reflecting surface 551 (reflecting surface 553) and guiding it to the phosphor 2.

Furthermore, the reflecting surfaces 551 to 554 of the wavelength-selective reflecting member 55 transmit yellow fluorescence 8 emitted from the phosphor 2 by excitation caused by the incidence of the excitation light 7 and blue excitation light 7a reflected by the phosphor 2. In the light source device 58, the yellow fluorescence 8 and the blue excitation light 7 are mixed to emit white light.

A part of the excitation light 7b transmitted without being reflected by the reflecting surface 551 (553) serving as the first reflecting portion is reflected by the reflecting surface 552 (554) serving as the second reflecting portion, and contributes to the white light emitted from the light source device 58.

In the light source device 58, the yellow fluorescence 8, the blue excitation light 7a reflected by the phosphor 2, and the excitation light transmitted through one reflecting surface and reflected by the other reflecting surface are mixed to emit white light.

Thus, the two laser diodes are provided, and the wavelength-selective reflecting member 55 having the four reflecting surfaces 551 to 554 is provided, so that it is possible to cause the excitation light, which has been transmitted through the reflecting surface but has not been incident on the phosphor, to be reflected by the other reflecting surface to contribute to white light. Thus, it is possible to provide the light source device 58 in which the light utilization efficiency is improved.

Note that the four reflecting surfaces are provided for two laser diodes in this embodiment, but two reflecting surfaces may be provided for one laser diode, so that a light source device having good light utilization efficiency can be similarly provided.

Next, a headlight, a display apparatus, and an illumination apparatus will be described as an apparatus to which each of the above-described light source devices is applied. Note that a cooling mechanism for cooling the light source device may be provided in contact with the substrate of the light source device, though not described below. Providing the cooling mechanism suppresses the influence of the heat generation of the light source device on the operating characteristics of the apparatus to which the light source device is applied.

Application Example to Headlight

Figure 17:
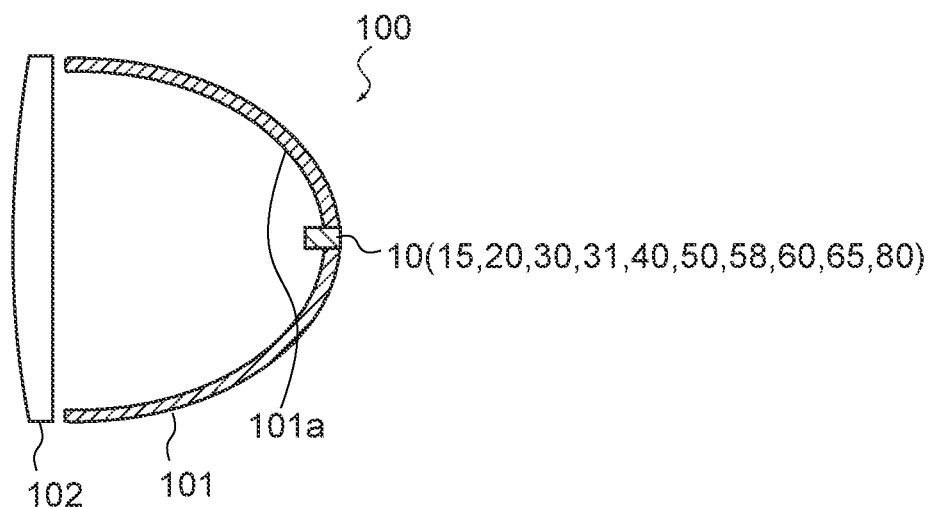
FIG. 17 is a schematic cross-sectional view of a headlight using each light source device described above.

FIG. 17 is a schematic cross-sectional view of a headlight 100.

The headlight 100 for vehicles includes a light source device 10 (15, 20, 30, 31, 40, 50, 58, 60, 65, 80), a reflector 101 having a reflecting surface 101a as an optical system, and a projection lens 102. The white light emitted from the light source device 10 (15, 20, 30, 31, 40, 50, 58, 60, 65, 80) is reflected by the reflecting surface 101a of the reflector 101, and is emitted to the outside of the headlight 100 via the projection lens 102 to illuminate the front of the vehicle.

Application Example to Display Apparatus

Figure 18:
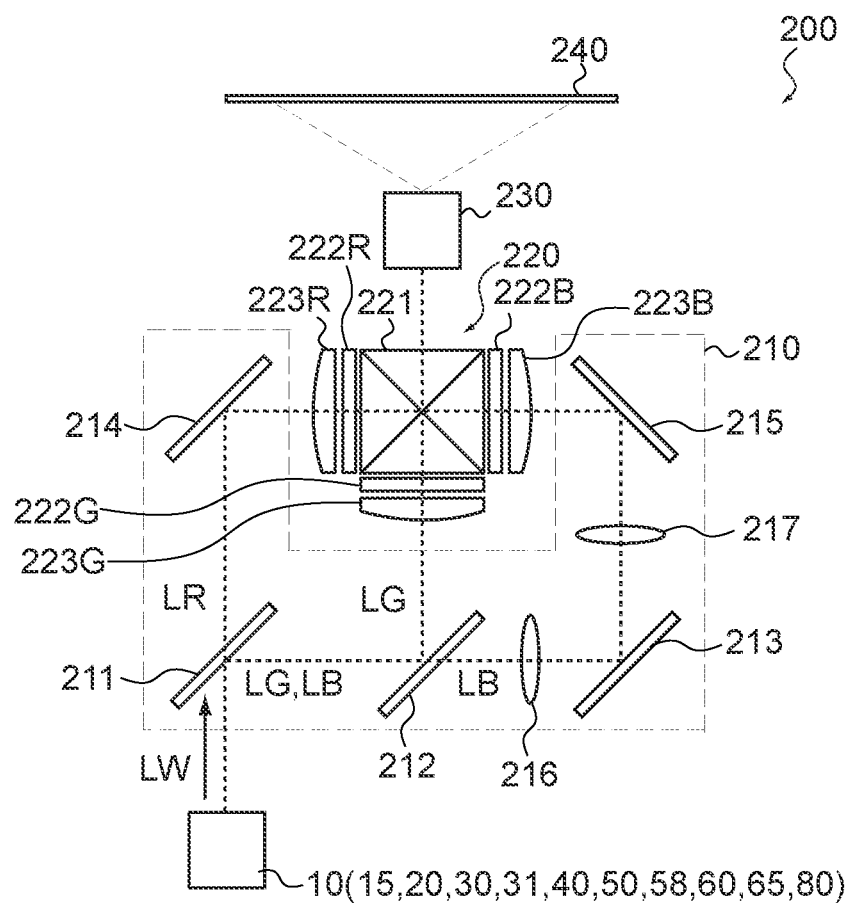
FIG. 18 is a configuration diagram of a projector using each light source device described above.

FIG. 18 is a schematic configuration view of a projector 200 as a display apparatus.

The projector 200 serving as a video projection display apparatus includes a light source device 10 (15, 20, 30, 31, 40, 50, 58, 60, 65, 80), a color separation optical system 210, a synthesis optical system 220, and a projection optical system 230.

The color separation optical system 210 separates white light (LW) emitted from the light source device 10 (15, 20, 30, 31, 40, 50, 58, 60, 65, 80) into red component light (LR), blue component light (LB), and green component light (LG).

The synthesis optical system 220 modulates the light of each color component separated by the color separation optical system 210 so as to become a color component of a desired image, and then synthesizes the modulated light to generate a desired video.

The projection optical system 230 is an optical system such as a projection lens or a mirror. The projection optical system 230 projects a video generated by the synthesis optical system 220 on a video display unit such as a screen 240 to display the video.

The color separation optical system 210 includes dichroic mirrors 211 and 212, reflecting mirrors 213 to 215, and relay lenses 216 and 217.

The dichroic mirror 211 transmits the red component light (LR) of the white light (LW) emitted from the light source device 10 (15, 20, 30, 31, 40, 50, 58, 60, 65, 80), and reflects the blue component light (LB) and the green component light (LG).

The reflecting mirror 214 reflects the red component light transmitted through the dichroic mirror 211 (LR) to be incident on a field lens 223R of the synthesis optical system 220.

The dichroic mirror 212 transmits the blue component light (LB) in the blue component light (LB) and green component light (LG) reflected by the dichroic mirror 211, and reflects the green component light (LG).

The green component light (LG) reflected by the dichroic mirror 212 is incident on a field lens 223G of the synthesis optical system 220.

The reflecting mirror 213 reflects the blue component light (LB) transmitted through the dichroic mirror 212 and the relay lens 216 to be incident on the relay lens 217.

The reflecting mirror 215 reflects the blue component light (LB) incident on the relay lens 217 and transmitted through the relay lens 217 to be incident on a field lens 223B of the synthesis optical system 220.

The synthesis optical system 220 includes a cross dichroic prism 221, a light modulation element 222R and the field lens 223R for red, a light modulation element 222G and the field lens 223G for green, and a light modulation element 222B and the field lens 223B for blue.

For example, a transmissive liquid crystal panel can be used for each light modulation element.

The red component light (RG) incident on the field lens 223R for red and transmitted through the field lens 223R is modulated so as to be a red component of a desired image in the light modulation element 222R and is incident on the cross dichroic prism 221.

Similarly, the green component light (RG) (blue component light (RB)) incident on the field lens 223G for green (field lens 223B for blue) and transmitted through the field lens 223G (223B) is modulated so as to be a green component (blue component) of a desired image in the light modulation element 222G (222B) and is incident on the cross dichroic prism 221.

The cross dichroic prism 221 combines the modulated red component light, green component light, and blue component light, and outputs the combined light to the projection optical system 230.

Note that the color separation optical system 210, the synthesis optical system 220, and the projection optical system 230, which constitute the projector 200, may be known, and are not limited to the structures described herein.

Further, the light source device 10 (15, 20, 30, 40, 50, 58, 60, 61, 80) of the present technology can be used for a backlight of a liquid crystal display apparatus.

Figure 19:
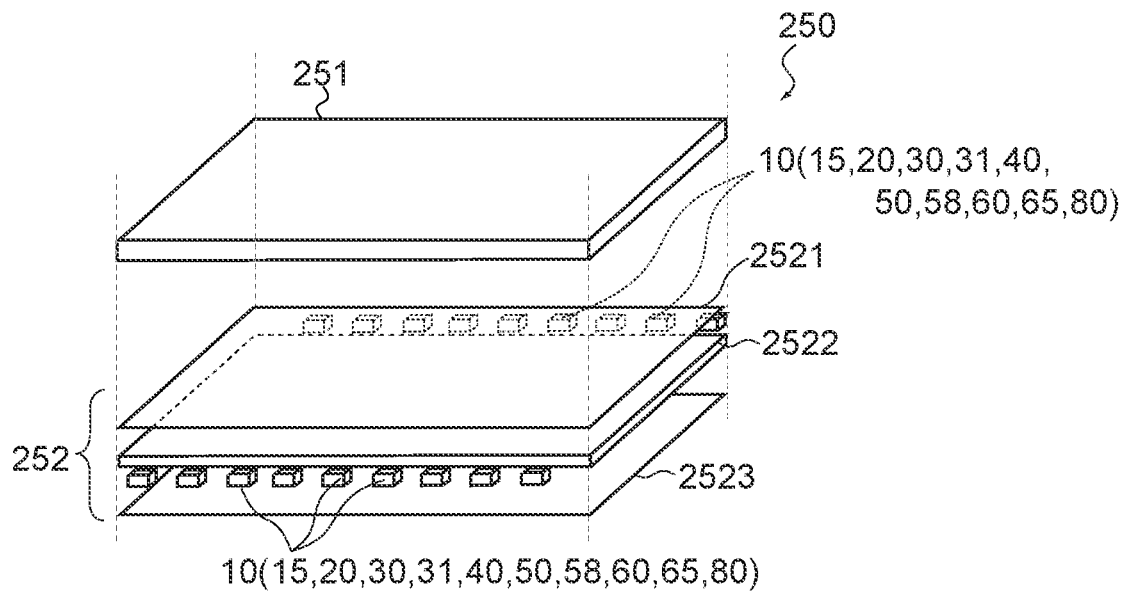
FIG. 19 is a schematic exploded perspective view of a backlight using each light source device described above and a liquid crystal display apparatus.

FIG. 19 is a schematic exploded perspective view of a liquid crystal display apparatus using a backlight of the edge light system.

Figure 20:
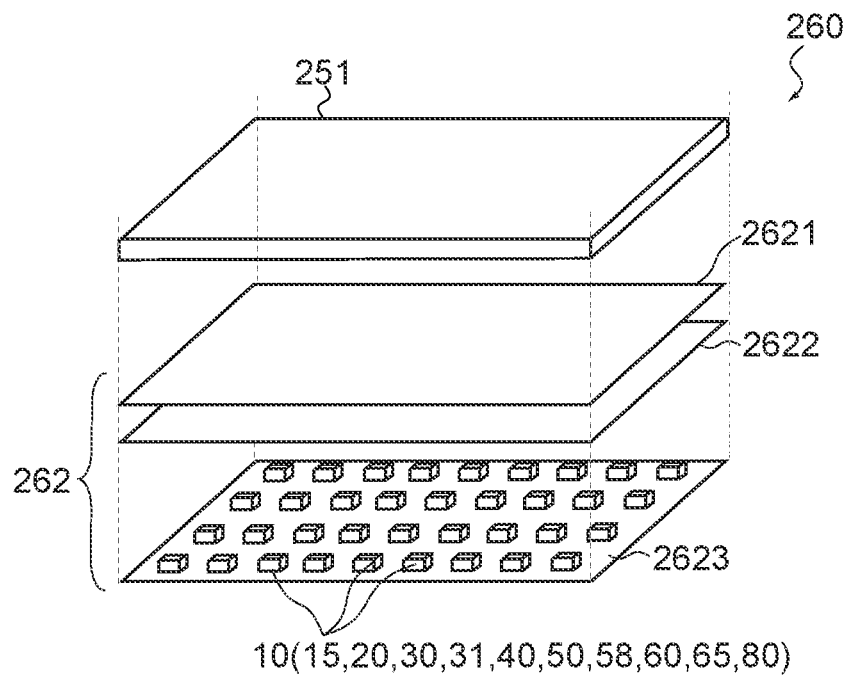
FIG. 20 is a schematic exploded perspective view of a backlight using each light source device described above and a liquid crystal display apparatus.

FIG. 20 is a schematic exploded perspective view of a liquid crystal display apparatus using a backlight of the direct system.

As shown in FIG. 19 (FIG. 20), a liquid crystal display apparatus 250 (260) as a display apparatus includes a transmissive liquid crystal panel 251 and a backlight 252 (262). In the liquid crystal display apparatus 250 (260), the rear side of the transmissive liquid crystal panel 251 is irradiated with white light emitted from the backlight 252 (262). The irradiation light is transmitted through the transmissive liquid crystal panel 251, and thus the transmittance thereof is controlled. As a result, an image is displayed on the transmissive liquid crystal panel 251.

As shown in FIG. 19, the backlight 252 of the edge light system includes a diffusion sheet 2521, a light guide plate 2522, a reflecting sheet 2523, and a plurality of light source devices 10 (15, 20, 30, 31, 40, 50, 58, 60, 65, 80).

The plurality of light source devices 10 (15, 20, 30, 31, 40, 50, 58, 60, 65, 80) is disposed along a pair of opposing sides of the light guide plate 2522 having a rectangular planar shape. Note that an example of the backlight in which the plurality of light source devices is disposed along the two sides has been described in this embodiment, but a backlight in which the light source devices are disposed along one side may be provided.

As shown in FIG. 20, the backlight 262 of the direct system includes a diffusion sheet 2621, a diffusion plate 2622, a reflecting sheet 2623, and a plurality of light source devices (15, 20, 30, 31, 40, 50, 58, 60, 65, 80). The plurality of light source devices is disposed, for example, in a matrix on the reflecting sheet 2623.

Application Example to Illumination Apparatus

Figure 21:
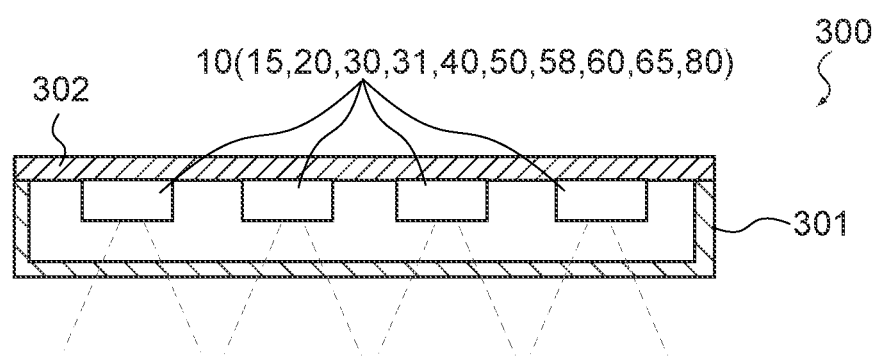
FIG. 21 is a schematic cross-sectional view of an illumination apparatus using each light source device described above.

FIG. 21 is a schematic cross-sectional view of an illumination apparatus 300. The illumination apparatus 300 illuminates, for example, indoor or outdoor spaces.

As shown in FIG. 21, the illumination apparatus 300 includes a plurality of light source devices 10 (15, 20, 30, 31, 40, 50, 58, 60, 65, 80), a translucent cover 301, and a base 302. The plurality of light source devices 10 (15, 20, 30, 31, 40, 50, 58, 60, 65, 80) is disposed on the base 302, and the translucent cover 301 is disposed so as to cover the plurality of light source devices. Light emitted from the light source device 10 (15, 20, 30, 31, 40, 50, 58, 60, 65, 80) is emitted to the outside of the illumination apparatus 300 via the translucent cover 301.

The embodiments of the present technology are not limited to the embodiments described above, and various modifications can be made without departing from the gist of the present technology.

Note that the present technology may take the following configurations.

(1) A light source device, including:
a substrate;
a phosphor disposed in contact with the substrate;
a light emitting element that emits excitation light for exciting the phosphor; and
a wavelength-selective reflecting member that partially reflects the excitation light emitted from the light emitting element to be guided to the phosphor and transmits fluorescence emitted from the phosphor by excitation caused by incidence of the excitation light and the excitation light reflected by the phosphor.

(2) The light source device according to (1), in which
the wavelength-selective reflecting member is located on an optical path of the fluorescence and the excitation light reflected by the phosphor with respect to the phosphor.

(3) The light source device according to (1) or (2), in which
the substrate includes a recess portion, and at least a part of the phosphor is disposed in the recess portion.

(4) The light source device according to (3), in which
the recess portion is formed in a first surface of the substrate, and
the phosphor is disposed in the recess portion such that a surface of the phosphor located on the wavelength-selective reflecting member side is flush with the first surface.

(5) The light source device according to any one of (1) to (4), in which
the wavelength-selective reflecting member is fixed to the substrate.

(6) The light source device according to any one of (1) to (5), in which
the wavelength-selective reflecting member is in no contact with the phosphor.

(7) The light source device according to any one of (1) to (6), in which
the wavelength-selective reflecting member includes
a first reflecting portion that partially transmits and partially reflects the excitation light emitted from the light emitting element to be guided to the phosphor and transmits the fluorescence emitted from the phosphor by excitation caused by the incidence of the excitation light and the excitation light reflected by the phosphor, and
a second reflecting portion that reflects the excitation light transmitted through the first reflecting portion to be guided to outside of the light source device.

(8) The light source device according to any one of (1) to (6), in which
the light source device includes two of the light emitting elements disposed opposite to each other with the wavelength-selective reflecting member interposed therebetween,
the wavelength-selective reflecting member includes
a first reflecting portion that partially reflects first excitation light emitted from one of the two light emitting elements to be guided to the phosphor and transmits fluorescence emitted from the phosphor by excitation caused by the incidence of the first excitation light and the first excitation light reflected by the phosphor, and
a second reflecting portion that partially reflects second excitation light emitted from the other one of the two light emitting elements to be guided to the phosphor and transmits fluorescence emitted from the phosphor by excitation caused by the incidence of the second excitation light and the second excitation light reflected by the phosphor, and
the first reflecting portion partially reflects the second excitation light that is transmitted through the second reflecting portion and guided to the first reflecting portion, and the second reflecting portion partially reflects the first excitation light that is transmitted through the first reflecting portion and guided to the second reflecting portion, to be guided to outside of the light source device.

(9) The light source device according to (7) or (8), in which
the wavelength-selective reflecting member is a single structure including the first reflecting portion and the second reflecting portion.

(10) The light source device according to any one of (1) to (9), in which
the substrate and the phosphor have irregularities on surfaces thereof brough into contact with each other.

(11) The light source device according to any one of (1) to (10), further including
a light receiving element that receives light emitted from the wavelength-selective reflecting member and not emitted to outside of the light source device.

(12) The light source device according to (11), further including
a control unit that controls output of the excitation light from the light emitting element on the basis of output from the light receiving element.

(13) A headlight, including:
a light source device including
a substrate,
a phosphor disposed in contact with the substrate,
a light emitting element that emits excitation light for exciting the phosphor, and
a wavelength-selective reflecting member that partially reflects the excitation light emitted from the light emitting element to be guided to the phosphor and transmits fluorescence emitted from the phosphor by excitation caused by incidence of the excitation light and the excitation light reflected by the phosphor; and
an optical system on which light from the light source device is incident.

(14) A display apparatus, including:
a light source device including
a substrate,
a phosphor disposed in contact with the substrate,
a light emitting element that emits excitation light for exciting the phosphor, and
a wavelength-selective reflecting member that partially reflects the excitation light emitted from the light emitting element to be guided to the phosphor and transmits fluorescence emitted from the phosphor by excitation caused by incidence of the excitation light and the excitation light reflected by the phosphor; and
a light modulation element on which light from the light source device is incident.

(15) An illumination apparatus, including
a light source device including
a substrate,
a phosphor disposed in contact with the substrate,
a light emitting element that emits excitation light for exciting the phosphor, and
a wavelength-selective reflecting member that partially reflects the excitation light emitted from the light emitting element to be guided to the phosphor and transmits fluorescence emitted from the phosphor by excitation caused by incidence of the excitation light and the excitation light reflected by the phosphor.

REFERENCE SIGNS LIST

1, 21, 63, 66, 71 substrate
2, 62, 67, 72 phosphor
4, 4A, 4B laser diode (light emitting element)

5, 35, 36, 55 wavelength-selective reflecting member (wavelength-selective reflecting member)
7 excitation light
8 fluorescence
10, 15, 20, 30, 31, 40, 50, 58, 60, 65, 80 light source device
21a, 63a, 66a first surface
21b, 63b, 66b recess portion
45a first wavelength-selective reflecting member (wavelength-selective reflecting member)
45b second wavelength-selective reflecting member (wavelength-selective reflecting member)
100 headlight
101 reflector (optical system)
102 projection lens (optical system)
200 projector (display apparatus)
222R, 222G, 222B light modulation element
250, 260 liquid crystal display apparatus (display apparatus)
251 liquid crystal panel (light modulation element)
300 illumination apparatus
351, 361, 451A first reflecting surface (first reflecting portion)
352, 362, 451B second reflecting surface (second reflecting portion)
551, 553 reflecting surface (first reflecting portion)
552, 554 reflecting surface (second reflecting portion)

The invention claimed is:

1. A light source device, comprising:
a substrate;
a phosphor in contact with the substrate;
a light emitting element configured to emit excitation light to excite the phosphor; and
a wavelength-selective reflecting member configured to:
    partially reflect the excitation light to be guided to the phosphor, and
    transmit the excitation light reflected by the phosphor and fluorescence emitted from the phosphor based on the excitation by incidence of the excitation light on the phosphor.

2. The light source device according to claim 1, wherein the wavelength-selective reflecting member is on an optical path of the excitation light reflected by the phosphor and the fluorescence with respect to the phosphor.

3. The light source device according to claim 2, wherein the substrate includes a recess portion, and
at least a part of the phosphor is disposed in the recess portion.

4. The light source device according to claim 3, wherein the recess portion is formed in a first surface of the substrate, and
the phosphor is in the recess portion such that a surface of the phosphor on the wavelength-selective reflecting member side is flush with the first surface.

5. The light source device according to claim 2, wherein the wavelength-selective reflecting member is fixed to the substrate.

6. The light source device according to claim 2, wherein the wavelength-selective reflecting member is in no contact with the phosphor.

7. The light source device according to claim 2, wherein the wavelength-selective reflecting member includes:
a first reflecting portion configured to:
    partially transmit and partially reflect the excitation light to be guided to the phosphor, and
    transmit the excitation light reflected by the phosphor and the fluorescence emitted from the phosphor based on excitation by the incidence of the excitation light on the phosphor, and
a second reflecting portion configured to reflect the excitation light transmitted through the first reflecting portion, wherein the excitation light transmitted through the first reflecting portion to be guided outside of the light source device.

8. The light source device according to claim 7, wherein the wavelength-selective reflecting member is a single structure including the first reflecting portion and the second reflecting portion.

9. The light source device according to claim 2, wherein the light source device includes a plurality of light emitting elements opposite to each other,
the wavelength-selective reflecting member is between the Plurality of light emitting elements, and
the wavelength-selective reflecting member includes:
a first reflecting portion configured to:
    partially reflect first excitation light emitted from a first light emitting element of the plurality of light emitting elements, wherein the first excitation light is partially reflected to be guided to the phosphor, and
    transmit the first excitation light reflected by the phosphor and fluorescence emitted from the phosphor based on excitation by the incidence of the first excitation light on the phosphor, and
a second reflecting portion configured to:
    partially reflect second excitation light emitted from a second light emitting element of the plurality of light emitting elements, wherein the second excitation light is partially reflected to be guided to the phosphor, and
    transmit the second excitation light reflected by the phosphor and fluorescence emitted from the phosphor based on excitation by the incidence of the second excitation light on the phosphor, wherein
    the first reflecting portion is configured to partially reflect the second excitation light that is transmitted through the second reflecting portion and guided to the first reflecting portion, and
    the second reflecting portion is configured to partially reflect the first excitation light that is transmitted through the first reflecting portion and guided to the second reflecting portion.

10. The light source device according to claim 9, wherein the wavelength-selective reflecting member is a single structure including the first reflecting portion and the second reflecting portion.

11. The light source device according to claim 2, wherein the substrate includes a first surface with irregularities,
the phosphor includes a second surface with irregularities, and
the first surface and the second surface are in contact.

12. The light source device according to claim 1, further comprising:
a light receiving element configured to receive light emitted from the wavelength-selective reflecting member and not emitted to outside of the light source device.

13. The light source device according to claim 12, further comprising:
a control unit configured to control output of the excitation light from the light emitting element based on an output from the light receiving element.

14. A headlight, comprising:
a light source device including;

a substrate,
a phosphor in contact with the substrate,
a light emitting element configured to emit excitation light to excite the phosphor, and
a wavelength-selective reflecting member configured to:
   partially reflect the excitation light to be guided to the phosphor, and
   transmit the excitation light reflected by the phosphor and fluorescence emitted from the phosphor based on the excitation by incidence of the excitation light on the phosphor; and
an optical system on which light from the light source device is incident.

15. A display apparatus, comprising:
a light source device including;
   a substrate,
   a phosphor in contact with the substrate,
   a light emitting element configured to emit excitation light to excite the phosphor, and
   a wavelength-selective reflecting member configured to:
      partially reflect the excitation light to be guided to the phosphor, and
      transmit the excitation light reflected by the phosphor and fluorescence emitted from the phosphor based on the excitation by incidence of the excitation light on the phosphor; and
a light modulation element on which light from the light source device is incident.

16. An illumination apparatus, comprising
a light source device including;
   a substrate,
   a phosphor in contact with the substrate,
   a light emitting element configured to emit excitation light to excite the phosphor, and
   a wavelength-selective reflecting member configured to:
      partially reflect the excitation light to be guided to the phosphor, and
   transmit the excitation light reflected by the phosphor and fluorescence emitted from the phosphor based on the excitation by incidence of the excitation light on the phosphor.

* * * * *